July 30, 1968   E. M. TATARZYCKI   3,394,750
PNEUMATIC EXPANSIBLE TIRE HAVING RESILIENT FOLDING SIDEWALLS
Filed July 28, 1966

INVENTOR.
EDWARD M. TATARZYCKI
BY John D. Haney
ATTY.

3,394,750
PNEUMATIC EXPANSIBLE TIRE HAVING
RESILIENT FOLDING SIDEWALLS
Edward M. Tatarzycki, Cuyahoga Falls, Ohio, assignor to
The B. F. Goodrich Company, New York, N.Y., a
corporation of New York
Filed July 28, 1966, Ser. No. 568,578
4 Claims. (Cl. 152—330)

ABSTRACT OF THE DISCLOSURE

An expansible tire of the type which is inflatable to a generally toroidal shape and which collapses on deflation by having the tread and carcass portions elastically contract to a smaller diameter, and by having the sidewalls fold on themselves inside the tread, and structurally including extra fabric pieces in the sidewalls which are separate from the inflation load-carrying plies for resiliently stiffening the sidewalls of the tires to augment the refolding action of the sidewalls during deflation of the tire.

---

Figure 1:
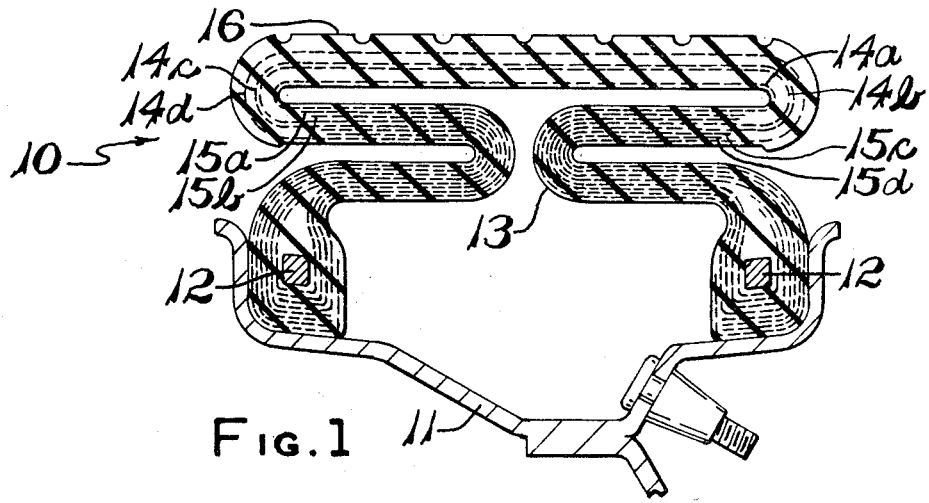

This invention relates to pneumatic tires and more particularly to a structural improvement in an expansible-type pneumatic tire to insure that the tire will collapse in the proper shape. Such expansible tires look and operate when inflated much like a conventional tire, but are designed to automatically fold or collapse into a much smaller size when deflated.

The improved expansible tire of this invention is made with conventional tire-making materials and components. Structurally, the tire includes a pair of laterally spaced annular inextensible beads with an interconnecting flexible annular carcass of elastomer-coated tire ply fabric and an external ground-engaging tread capable of significant elastic expansion in circumference. In the sidewall regions there are flexible folds permanently set by molding these regions when the tire is vulcanized so that each sidewall region is folded on itself axially inside the tread. So long as the tire is deflated, the tread is circumferentially contracted (resiliently) toward the beads and the sidewall regions are folded axially inside the tread so that the external diameter and lateral width of the tire is very much smaller when deflated than when it is inflated. For example, a typical passenger car tire of this type may have its outside diameter at the crown of the tread in the order of 30% to 40% smaller when the tire is deflated than when it is inflated, and the lateral width when deflated may be about 10% smaller than when inflated. Accordingly, the total space occupied by a tire-and-wheel assembly of this type is about 50% smaller when the tire is deflated than when inflated.

These tires are normally maintained in their smaller deflated condition on their respective service wheels, and are inflated to their larger operating size only during the periods the wheels are in actual operating or load-carrying service. Owing to the inherent stiffness of the flexible carcass, and the elasticity of the elastomer matrix of the carcass, a tire of this type normally assumes and remains in the collapsed or folded configuration in which it has been molded so long as it is deflated and is otherwise free of externally applied deforming forces. During inflation, the flexible folded portion of the sidewall region is displaced so that it flexibly unfolds, and the carcass portion is elastically expanded by the inflation medium until the tire carcass approaches or assumes the characteristic open-bellied toroidal shape of a common pneumatic tire of the prior art. When fully inflated, these tires look and operate substantially like any prior art tire of corresponding size for the same service. On subsequent deflation, however, the carcass region elastically contracts to collapse the tire to its initial smaller size, with the sidewall region refolding into the original molded configuration.

According to the present invention, we have found that the proper refolding action of the sidewalls in this type tire can be greatly expedited and assured by the simple expedient of incorporating additional fabric layers into the sidewall regions of the tires in the regions of the sidewalls forming the apices of the folds. These additional fabric layers are, in effect, "short" plies. That is to say, rubber-covered tire cord fabric is used for these plies and they are applied to a green tire carcass during the building procedure in the same manner that the load-carrying plies are laid. These fabric layers do not, however, extend across the tread or crown area of the tire carcass. Instead they cover only the sidewall regions, preferably from the bead to about the region of the tread shoulder, and preferably these fabric layers or short plies are sandwiched alternately between the main load-carrying plies. The extra layers or short plies may be added or built into the carcass either before or after the main load-carrying plies are added. The extra short plies are laid with cord angles opposite each other just as is done with with the main plies.

The addition of the extra "short" plies in the sidewall tends to increase the sidewall stiffness and resilience. Accordingly, when the tire is inflated to unfold the sidewalls, these extra stiffening plies tend to act like springs. Thus the inflation pressure tends to resiliently deflect the sidewalls to unfold them against the resistance of their augmented stiffness. On subsequent deflation the sidewalls tend to spring back to their initial folded shape more quickly than if the sidewalls contain only the load-carrying plies. The short plies thus tend to insure a quick, proper folding action of the sidewalls when the tire is collapsed.

Figure 2:
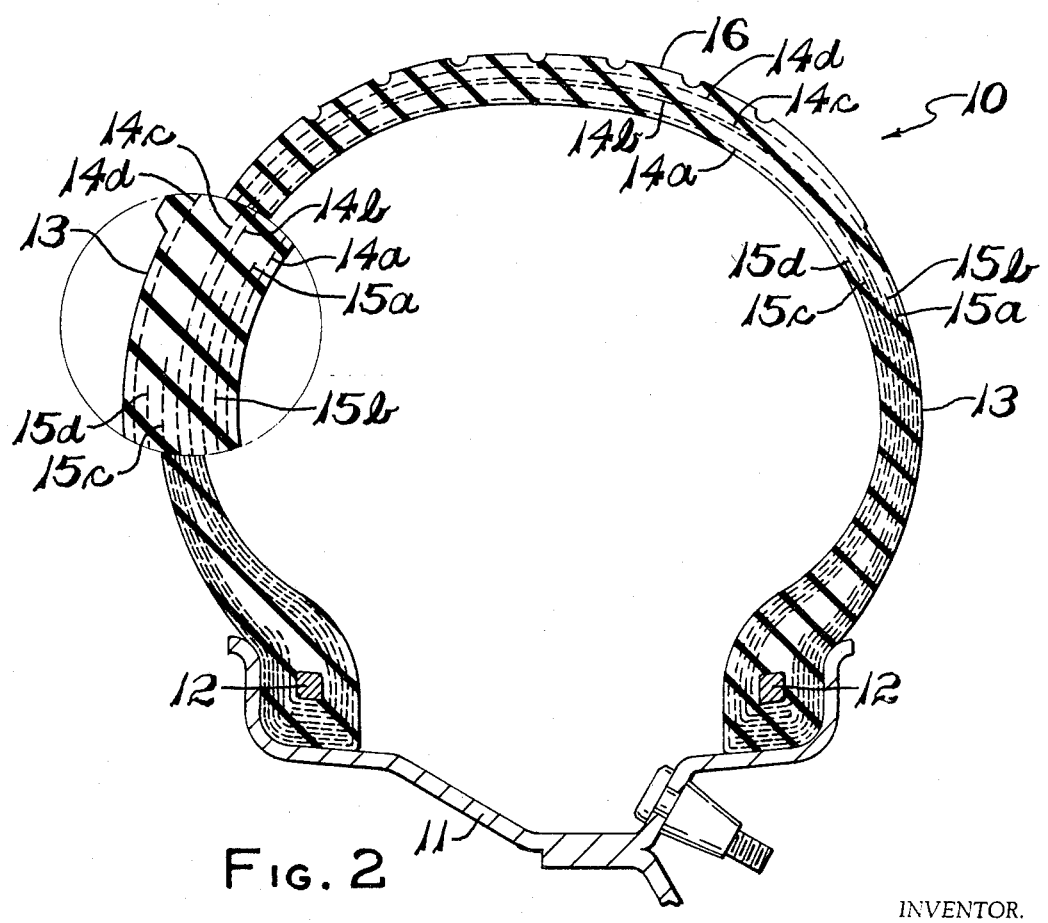

The invention will be further explained with reference to the accompanying drawing which shows, by way of example, one preferred tire for passenger automobiles made according to and embodying this invention. In the drawings:

FIG. 1 shows a cross section through a tire and wheel rim assembly with the tire collapsed and folded; and FIG. 2 shows a cross section like FIG. 1 except that the tire is inflated.

Referring to the drawings, the tire 10 is mounted on a standard drop-center type automotive rim 11. Structurally, the tire 10 has a pair of annular laterally spaced inextensible beads 12 with a flexible carcass 13 extending between and fastened to each of the beads. The carcass 13 includes four main load-carrying fabric plies 14a, 14b, 14c, and 14d, which extend continuously from one bead 12 to the other in the conventional manner in which tire plies are built into an ordinary pneumatic tire. Additionally, in each sidewall there are four short sidewall stiffening "plies" 15a, 15b, 15c, and 15d. These sidewall stiffening plies 15a etc. in each sidewall extend from their respective bead 12 to a region near the shoulders or lateral margins of the tread portion 16 of the tire.

In this preferred construction, the sidewall stiffening plies 15a etc. are pieces of bias cut rubber-covered tire cord; and they are used in pairs with their bias angles opposing in adjoining plies. One pair of these sidewall stiffening strips, 15a and 15b, is positioned between the two innermost load-carrying plies 14a and 14b in each sidewall as best shown in the magnified section of FIG. 2. Another similar pair of stiffening strips, 15c and 15d, is located in each sidewall between the two outermost load-carrying plies 14c and 14d.

The stiffening plies 15a, etc. are laid with the same cord angle as the load-carrying plies 14a etc. and then extend circumferentially around the sidewall. If the innermost load-carrying ply 14a is laid on the building drum at an angle of say 65 degrees (a typical cord angle) (the angle referred to being the angle between the cord and the medial center plane of the tire normal to its rotational axis), then the innermost stiffening ply 15a in each sidewall is laid at the same angle and in the same direction. Preferably the next mating stiffening ply 15b is also laid at 65 degrees but at the opposite angle so that its cords cross the corresponding cords of the first stiffening ply 15a. Then the second load-carrying ply 14b is laid at 65 degrees but at the opposite angle to ply 14a. In a similar manner the remaining successive plies are laid up on the building drum.

The foregoing components of the tire are preferably all conventional tire-making materials. The beads 12 are preferably wire-wound grommets and the plies 14 are fastened to the beads all in accordance with common industry practice for building passenger car tires. The plies 14 and stiffening plies 15 are preferably conventional tire cord fabrics (wefted or weftless) such as nylon, rayon, or special polyester cords. The elastomeric coatings on the fabrics are likewise conventional tire-making rubber compounds, as is the tread region 16.

Additionally, this tire may be built on conventional passenger tire production machinery. That is to say, the tire may be built in cylindrical form according to the so-called flat band tire-making method. The tire cord material from which the plies 14 are made is initially coated with an elastomer and then bias cut and laid with the cord angle of successive plies opposing each other as explained in the foregoing. The short stiffening plies 15 are laid up in their proper locations just like the main load-carrying plies. The resulting cylindrical green tire carcass is then axially compressed into a special mold (not shown) which has a molding surface contour for imparting to the tire a permanent molded configuration substantially as shown in FIG. 1.

For passenger car service this type tire is preferably molded with a generally "flat" or cylindrical tread portion 16 which has its lateral margins or tread shoulders 17 merging with the sidewall regions 18 leading to the beads 12. Each sidewall region 18 is molded so that it has a permanent flexible hairpin-shaped fold 20 extending circumferentially around the tire. That is to say, each side wall region 18 comprising load-carrying plies 14 and stiffening plies 15 is folded on itself during the molding operation so that in the deflated condition of the tire, most of the sidewall region between the bead and the tread shoulder extends axially inward and is generally concentric with the tread region 16. The folded regions 20 define in the deflated condition an annular reentrant channel open to the exposed or outside surface of the tire.

The beads 12 of the tire are preferably molded so that they form an interference fit with the adjoining bead seat regions of the wheel rim along the internal surface of the rim flanges 21.

The tire preferably further includes the usual materials and features to enable the tire to operate satisfactorily in tubeless condition. The tire may be inflated or deflated by a standard rim-mounted inflation valve 23.

After the tire is initially mounted on its rim 11, preferably it is inflated just enough to wedge the beads 12 tightly against the respective bead seats of the rim. Thereafter with the tire fully deflated, the beads normally tend to remain snugly seated in the bead seats in the manner shown. To assist in maintaining the beads properly seated after a mounted tire is deflated, the tire is preferably molded with the beads 12 spaced laterally a slightly greater distance than the actual distance between the inside surfaces of the rim flanges 21.

To place the resulting tire-and-rim assembly in load-carrying service, any suitable inflation mechanism may be used to introduce an inflating medium through valve 23 into the chamber defined by the interior surface of the tire and the rim 11. For passenger cars a pressure bottle of compressed air or carbon dioxide may be used for quick, convenient inflation. Progressive inflation of the tire stretches the carcass circumferentially in the tread region 16 and progressively unfolds the sidewall regions 18. The apices of the folds, indicated by numerals 20, are displaced laterally away from each other until the tire approaches or assumes approximately the generally toroidal shape indicated in FIG. 3. When fully inflated the tire functions like any other tire of the same class and size. For emergency use in passenger cars, this improved tire may have a significantly thinner tread than would ordinarily be used with a conventional passenger car tire. The thinner thread emergency tire would be operated in load-carrying service only for a period sufficient to enable the main wheel tire to be repaired. By an appropriate selection of the tread dimensions and tread and carcass materials, however, the mileage available for a tire of this class may be varied significantly.

On release of inflation, the elasticity of the carcass portion, including particularly the tread region of the carcass and the stiffened sidewalls causes the carcass to return or retract to substantially its original molded shape. During the retraction each sidewall 18–20 automatically refolds to the position shown in FIG. 1.

Owing to the presence of the stiffening plies 15a etc. the sidewalls 18 are much more resilient than they would otherwise be with only the load-carrying plies 14a etc. Accordingly, the stiffened sidewalls 18 act like springs which are loaded or deflected when the inflating medium unfolds the sidewalls into the FIG. 2 configuration. Then when the tire is subsequently deflated, these stiffened sidewalls have a very strong tendency to spring back to the folded position in which they were initially molded. A similar action occurs even without the presence of the stiffening plies, but the presence of the latter greatly augments the spring back characteristics of the sidewalls and thereby insures that the sidewalls will refold properly before the tread region circumferentially contracts.

The carcass portion of this tire is capable of accommodating the unusually great circumferential elongation of the tread region between the deflated and inflated condition by a combination of the elasticity of the elastomer matrix in which the tire cord fabric is molded and by the pantographing action of the tire cords in the load-carrying plies 14 and the stiffening plies 15. A typical type passenger car tire made according to this invention may be built up by wrapping elastomeric coated plies of tire cord 14 and 15 about a cylindrical building drum with the cords forming an angle to the circumference of the building drum of about 60 to 65°, for example. At the conclusion of the building stage, the resulting cylindrical green tire casing is then axially compressed and molded substantially to the shape shown in the solid lines in the drawing. The steps of shaping the green carcass and molding it may shift the original cord angle to about 55–60° to the circumference (or the medial center plane) of the tread. This relatively small shift or "pantographing" of the cords during the molding results from the relatively low profile of the tire and it is very much less than the corresponding action of the cords which normally occurs where a similarly built tire is cured in the familiar toroidal form.

A much greater pantographing or cord angle shift occurs, however, in this type tire during its inflation after it is fully cured. The angle of the cords of the plies 14 and 15 of the tire noted in this example may shift from about 55–60° when the cured tire is in deflated condition, to about 35–45° when the tire is fully inflated. In each case the angle noted is measured from the medial circumference or medial center line of the tire tread. The elastic character of the elastomer matrix in which the cords are molded permits such a radical pantographing action of the cords between the inflated and deflated condition. The tire cords themselves in this tire are not intended to and do not themselves appreciably elongate during the elastic expansion of the tire carcass as it is inflated. The remarks in the foregoing description about the expansion of the tire carcass are intended to refer to an expansion involving a shifting or pantographing action of the tire cords. A tire carcass does not stretch uniformly in all directions when inflated like a homogeneous wall pressure vessel such as a simple balloon.

The foregoing angular ranges have been cited merely to illustrate the order of magnitude of the changes in cord angle which occurs in one specific size passenger car tire from the time the carcass plies are laid up on the cylindrical building drum to the time the tire is fully inflated. The actual selection of cord angles in making these tires will follow conventional practice and will depend primarily on the ultimate shape desired for the tire cross section after it is fully inflated and also on the intended service for the tire. In aircraft tires, for example, the cord angles of the several plies may undergo even greater proportional change than those described in the foregoing example.

The cord angle shifting effect which occurs in this type tire also occurs in other common pneumatic tires. There is a much greater shift in this type tire, however, during its inflation than ordinarily would occur in common tires.

The folds in the sidewall regions 18 of the illustrated tire are in substantial axial alignment with each other. Each extends almost to the medial circumferential center line of the tread region 16. The axial depth of each fold 20 may be varied depending on the size and shape desired for the inflated configuration of the tire. If the folds are more shallow than those illustrated, the radial width of the inflated tire would be correspondingly reduced. On the other hand, the radial width of the tire in its inflated condition may be significantly increased by forming the folds 20 of deeper or greater axial extent than those shown and making the folds so that one concentrically overlaps the other.

For aircraft, truck or other heavy-duty service, a tire according to this invention may be made with a great many more plies than the two shown in the drawing, and ordinarily such tires would have a much thicker thread region. Such tires may additionally include other special structural details such as fabric reinforcements of the tread. In any case, however, such tires may be made with at least one permanent inwardly folded region in the sidewall portion of the carcass in which there are extra added stiffening plies 15 to augment the stiffness and therefore the resilience of the sidewalls in accordance with the principles of this invention.

What is claimed is:

1. A pneumatic tire inflatable to a generally toroidal shape, the tire comprising a pair of laterally spaced annular beads and an annular flexible carcass of load-carrying elastomer-coated fabric plies with a circumferential tread region and opposing sidewall regions between said tread region and each bead, at least one sidewall region having a flexible fold permanently set in the sidewall region, the fold extending circumferentially of the carcass in a continuous reentrant channel open to the outside surface of the sidewall in the deflated condition of the tire and adapted to unfold and assume a generally toroidal shape when the tire is inflated, and elastomer-covered fabric pieces in the sidewall containing said fold and which are resiliently deformable by the unfolding action of the tire sidewall when inflated for refolding such sidewall when said tire is subsequently deflated.

2. A tire according to claim 1 wherein said elastomer-covered pieces extend circumferentially of said folded sidewall from a location near the bead to a location near the tread.

3. A pneumatic tire of the type which is inflatable to a generally toroidal shape and which comprises a pair of laterally spaced annular beads and an annular flexible elastically distensible carcass of load-carrying elastomer-coated fabric plies with a circumferential tread region and opposing flexible sidewall regions between said tread region and each bead, at least one sidewall region having a flexible fold permanently set in the sidewall region, the fold extending circumferentially of the carcass in a continuous reentrant channel open to the outside surface of the sidewall in the deflated condition of the tire with the apex of the sidewall fold having a diameter about the same size as the bead diameter, said carcass being adapted to distend and said sidewall being adapted to unfold to assume a generally toroidal shape when the tire is inflated, and characterized in that said folded sidewall includes extra elastomer-covered fabric pieces which are resiliently deformable by the unfolding action of the tire sidewall when inflated for augmenting the refolding of such sidewall during deflation.

4. A tire according to claim 3 and further characterized in that said extra fabric pieces of the folded sidewall extend from the sidewall fold apex toward the beads and toward the tread portion in a generally axial direction of the tire when the tire is deflated.

References Cited

UNITED STATES PATENTS 3,347,300  10/1967  Sidles _____ 152—352

ARTHUR L. LA POINT, *Primary Examiner.*

C. B. LYON, *Assistant Examiner.*

UNITED STATES PATENT OFFICE
CERTIFICATE OF CORRECTION

Patent No. 3,394,750                          July 30, 1968

Edward M. Tatarzycki

It is certified that error appears in the above identified patent and that said Letters Patent are hereby corrected as shown below:

Column 4, line 14, and column 5, line 44, "thread", each occurrence, should read -- tread --. Column 6, before line 50, insert the following references:

```
2,751,959  6/1956  Blomquist   ----------- 152-352XR
3,052,429  9/1962  Simon et al. --------  152-330XR
3,116,778  1/1964  Herzegh et al. ------  152-330
```

Signed and sealed this 30th day of December 1969.

(SEAL)
Attest:

Edward M. Fletcher, Jr.                     WILLIAM E. SCHUYLER, JR.
Attesting Officer                              Commissioner of Patents